(133.)
D. E. McSHERRY.
Improvement in Grain Drills.
No. 122,729. Patented Jan. 16, 1872.
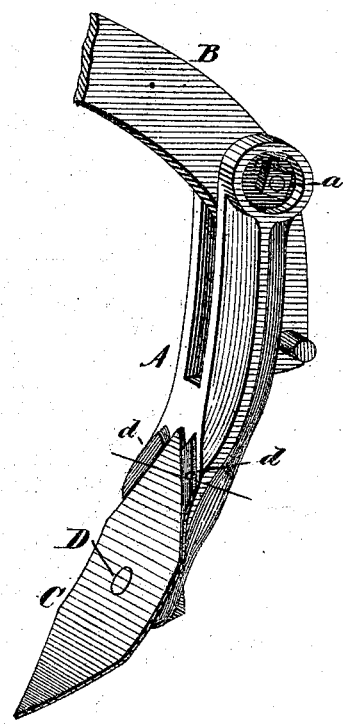
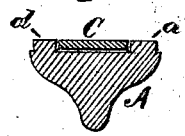
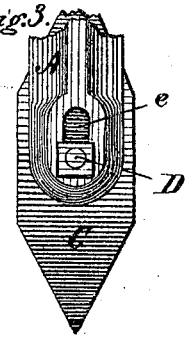
Witnesses.
Harry King.
Phil. T. Dodge.
Inventor.
Daniel E. McSherry
by Dodge & Munn
his attys

UNITED STATES PATENT OFFICE.

DANIEL E. McSHERRY, OF DAYTON, OHIO.

IMPROVEMENT IN GRAIN-DRILLS.

Specification forming part of Letters Patent No. 122,729, dated January 16, 1872.

SPECIFICATION.

*To all whom it may concern:*

Be it known that I, DANIEL E. McSHERRY, of Dayton, in the county of Montgomery and State of Ohio, have invented certain Improvements in Hoes for Grain-Drills, Cultivators, &c., of which the following is a specification, reference being had to the accompanying drawing.

My invention consists in a shank provided with a double-ended pivoted shovel and studs to hold the same in position and prevent it from turning.

Figure 1 is a perspective view of my improved shank with its shovel attached. Fig. 2 is a cross-section of the same on the line $x\,x$, Fig. 1; and Fig. 3 is a back view of the lower end of the same.

A represents my shank, made of cast-iron, in the form shown, with its upper end slotted to fit upon the drag-bar B, and provided with an eye or hole to receive the fastening-bolt or pivot $a$. C represents the shovel or hoe, which is made longer than usual, with points at both ends and secured to the shank by a bolt, D, passing through its center, so that when one end of the shovel becomes worn it may be turned around on the bolt and the other end presented for use. To prevent the shovel from turning while in use the shank is formed with two studs or flanges, $d$, between which the upper end or point of the shovel fits, as shown in Fig. 1. When the shovel is to be reversed the bolt is first loosened, so as to let the point be lifted out from between the studs or flanges and then the shovel turned around and the bolt is again tightened up, so as to draw the point down between the studs. The shank is provided with a slot, $e$, through which the bolt of the shovel passes, as shown in Fig. 3, so that as the shovel grows shorter from wear, the bolt may be moved up in the slot, so as to force the shovel-point snugly between the studs. Where very long or very thin shovels are used their points may be sprung out from between the studs without loosening the bolt.

It is obvious that instead of an iron shank or standard a wooden one may be used and provided with studs or flanges $d$, attached in any suitable manner; and it is also obvious that when the shank is provided with the slot $e$ a shovel may be used having its two ends of different forms, as, by moving the shovel vertically, the points may be forced between the studs or flanges.

Having described my invention, what I claim is—

1. The combination of the reversible hoe or tooth C with shank A, provided with flanges $d$, for the purpose of holding it in position, substantially as herein described.

2. The shank A, provided with the flanges $d$ and slot $e$, in combination with the hoe or shovel $c$, for the purpose of adjusting the latter, as described.

DANIEL E. McSHERRY.

Witnesses:
J. A. SHAUCK,
EDWARD BRENEMAN. (133)